Dec. 12, 1950 R. V. HOWARD 2,533,253
AUTOMATIC REGULATING SYSTEM AND PEAK LIMITER
Filed Sept. 17, 1945
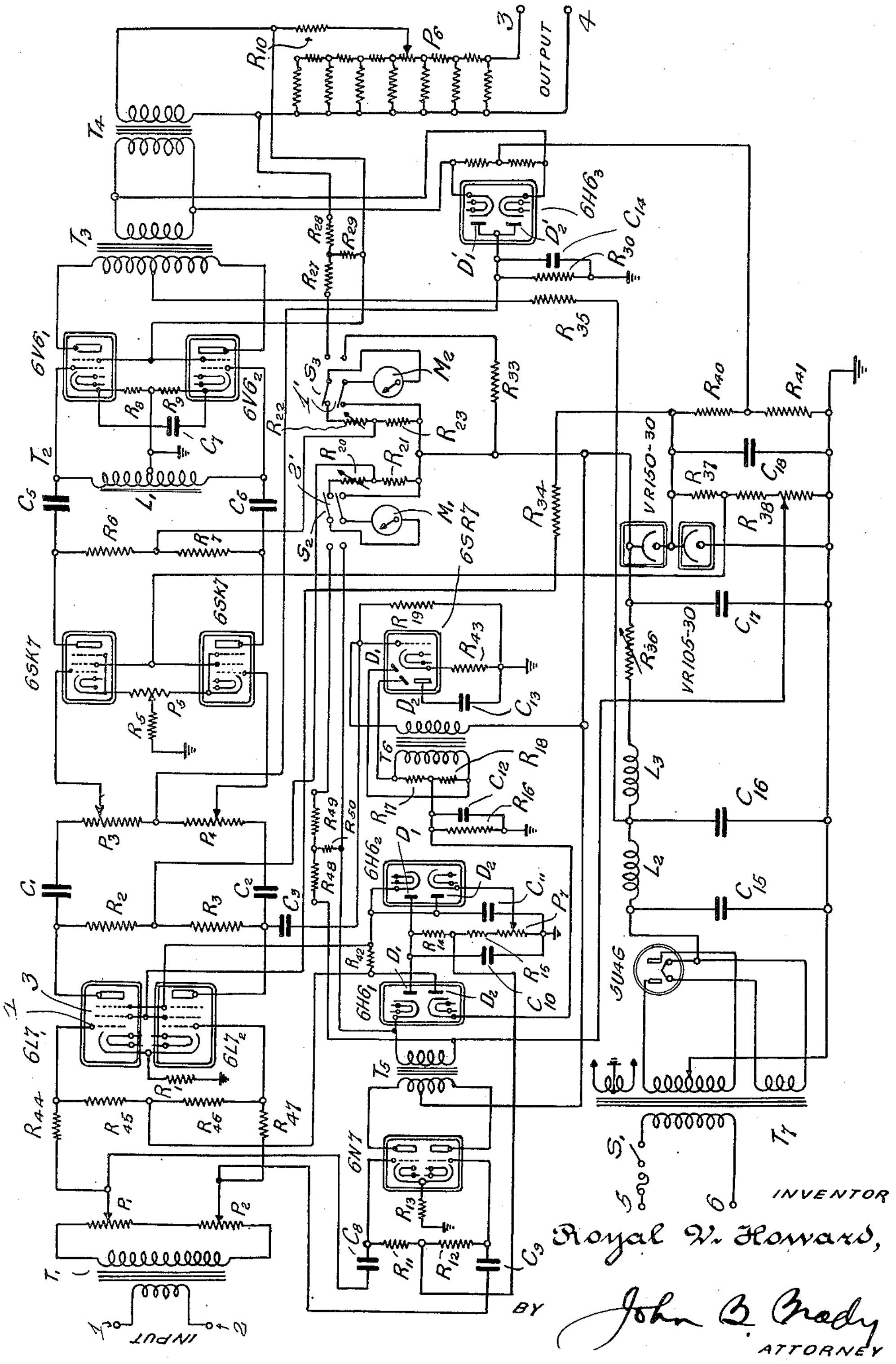
INVENTOR
Royal V. Howard,
BY John B. Brady
ATTORNEY Patented Dec. 12, 1950 2,533,253

UNITED STATES PATENT OFFICE 2,533,253

AUTOMATIC REGULATING SYSTEM AND PEAK LIMITER

Royal V. Howard, San Francisco, Calif.

Application September 17, 1945, Serial No. 616,828

8 Claims. (Cl. 178—44)

My invention relates broadly to electron tube circuits and more particularly to an improved circuit arrangement for effecting automatic regulation and limiting the amplitude peaks of the energy passing through the electron tube circuits.

This invention is an improvement upon my invention upon Automatic Regulating System as set forth in my Patent 2,392,384, granted January 8, 1946.

One of the objects of my invention is to provide an improved method and apparatus for automatically maintaining signalling currents at a constant level through an electronic system regardless of the variations of the input level of the current between certain limits.

Another object of my invention is to provide a program level control system particularly suitable for use in association with radio broadcast transmitters where high fidelity operation is essential.

Still another object of my invention is to provide a combined automatic regulator and peak limiter for electronic amplification systems in which regulating and peak limiting action is effected from stage to stage of a multiple stage electronic amplification system.

Still another object of my invention is to provide a circuit arrangement for a combined program control system and peak limiter for electronic systems operating in the acoustic range in which a multiplicity of coacting time delay circuits are arranged for bias control of separate coacting sections of the electronic system for effecting combined program level and peak control of the modulated currents.

A further object of my invention resides in a circuit arrangement for improved system of combined program level control and program peak control which may be interchangeably used, singly as a program level control or a program peak control or limiter independently of its use as a combined program level and peak control apparatus.

Other and further objects of my invention reside in a circuit arrangement for a combined program level and peak control system for the modulation circuit of a voice communication system as set forth more fully in the specification hereinafter following by reference to the accompanying drawing which diagrammatically shows the circuit arrangement of my invention.

Referring to the drawing in detail, power of 120 volts alternating current at 60 cycles is applied to terminals 5 and 6, and switch $S_1$ closed.

The modulated program current is applied at terminals 1 and 2. The ganged potentiometers $P_1$ and $P_2$ are used to set program level to the proper operating point as indicated on meter $M_1$ (switch $S_2$ on position 2′). The ganged potentiometers $P_3$ and $P_4$ can then be set for desired peak control as indicated by meter $M_2$ (switch $S_3$ on position 1′). Potentiometer $P_6$ is finally set for desired output level.

With the controls thus set, the automatic action is as follows:

The program input level is amplified by dual triode 6N7, resistance capacity coupled from potentiometers $P_1$ and $P_2$, through condensers $C_8$ and $C_9$ and resistances $R_{11}$ and $R_{12}$. The 6N7 output is transformer coupled by $T_5$ to diode $D_1$ of $6H6_1$ tube. Self cathode bias of the 6N7 tube is supplied by means of the drop across resistor $R_{13}$. The rectified output of $D_1$ is applied across voltage divider made up of resistors $R_{14}$, $R_{15}$ and potentiometer $P_7$. It is filtered by means of condenser $C_{10}$. A portion of this voltage is applied to condenser $C_{11}$ through conducting diode $D_2$ of $6H6_2$ tube. This voltage is also applied to diode $D_1$ of $6H6_2$ tube and the mixer grids (grids #3) of the 6L7 tubes. It is also applied to the control grids (grids #1) of the 6L7 tubes through resistances $R_{42}$, $R_{45}$ and $R_{46}$. This potential causes the voltage gain of the 6L7 tubes to be reduced due to their variable mu characteristic. If the average program level as applied to transformer $T_1$ should increase, it will, therefore, further reduce the gain causing its output to remain constant. If the input level at terminals 1 and 2 should decrease slightly, the charge on condenser $C_{11}$ will very slowly leak off, due to its very high self leakage resistance, causing the gain of the 6L7 tubes to increase slightly. If the input level should decrease a considerable amount, the gain will remain substantially constant for several seconds until the charge on condenser $C_{10}$ decreases to a value equal to that on condenser $C_{11}$, at which time diode $D_1$ of $6H6_2$ will conduct the charge on condenser $C_{11}$ to the shunt resistance made up of resistors $R_{14}$, $R_{15}$ and potentiometer $P_7$. The rate of discharge (gain increase) of condenser $C_{11}$ is then determined by the sum of resistors $R_{14}$, $R_{15}$ and potentiometer $P_7$. Any decrease in input level causes a corresponding decrease in rectifier voltage to appear across $C_{10}$.

The arrangement of $6H6_2$ diodes $D_1$ and $D_2$ in combination with condensers $C_{10}$, $C_{11}$, resistors $R_{14}$, $R_{15}$ and potentiometer $P_7$ causes the amplifier gain to remain absolutely constant as long as the average program level is constant and remains so for several seconds upon cessation of program. This is desirable where short interruptions may occur. However, upon resumption of program, the instantaneous gain of the 6L7 tubes is too high and would cause serious overload during the period that condenser $C_{11}$ is slowly charging, if it were not for the action of another amplifier and rectifier control made up of tube 6SR7 resistance capacity coupled through condenser $C_3$ and resistor $R_{19}$ from the output of the $6L7_2$ tube. This combination tube has a triode biased by resistance $R_{43}$ and by-passed by condenser $C_{13}$. The drop across resistor $R_{43}$ also biases the diodes $D_1$ and $D_2$ of tube 6SR7.

As the program begins, the peak voltage as applied to the diodes $D_1$ and $D_2$ exceed this bias voltage, causing a rectified voltage to appear across resistor $R_{16}$ and condenser $C_{12}$, diodes $D_1$ and $D_2$ being transformer coupled from the plate of 6SR7. This voltage is applied to diode $D_2$ of $6H6_1$ which conducts it to the 6L7 tube control grids (grids #1) thereby reducing the gain due to the variable mu action of the tubes. At the same time condenser $C_{11}$ will slowly charge from this same source due to resistor connection of $R_{42}$. However, until the charge on condenser $C_{11}$ reaches its operating point, the program instantaneous peaks are limited to a constant value due to the action of the control grids. This limiting action lasts only until condenser $C_{11}$ reaches a constant value at which time the diodes $D_1$ and $D_2$ of the 6SR7 tube become inactive, due to the bucking charge on condenser $C_{11}$ built up from action of diode $D_1$ of tube $6H6_1$ and diode $D_2$ of tube $6H6_2$. Also the gain of the 6L7 tubes has decreased, causing the peak program level to drop to a point just below the bias on diodes $D_1$ and $D_2$ of the 6SR7 tube.

Some additional bias is applied to the control grids of the tube 6N7 by connecting the common point of resistors $R_{11}$ and $R_{12}$ to a point which joins resistors $R_{14}$ and $R_{15}$. This is to automatically reduce the gain of the 6N7 tube as program current increases. It is provided to prevent the gain of the 6L7 tubes to be overcontrolled when the program input level becomes excessive.

Thus, it is seen that the average level output from the 6L7 tubes can be maintained at a substantially fixed level, regardless of the variation of the input level between certain limits.

The 6L7 tubes are resistance capacity coupled by means of resistors $R_2$, $R_3$, condencers $C_1$, $C_2$ and potentiometers $P_3$ and $P_4$ to the control grids of the 6SK7 tubes. These tubes also have a variable mu characteristic. Their cathode self bias is obtained by means of potentiometer $P_5$ and resistor $R_5$. Potentiometer $P_5$ is set to maintain the gain of the tubes equal, resulting in perfect push pull balance. The output of the 6SK7 tubes are resistance capacity coupled to the control grids of the 6V6 tubes, by means of resistors $R_6$, $R_7$, condensers $C_5$, $C_6$ and inductive impedance $L_1$. The use of inductive impedance $L_1$ cancels the action of thumps caused by the changing charge on condensers $C_5$ and $C_6$. The value of condensers $C_5$ and $C_6$ is selected so as to resonate inductive impedance $L_1$ at about 40 cycles, thereby effecting good low frequency response.

The 6V6 tubes are cathode self biased by means of resistors $R_8$ and $R_9$. Condenser $C_7$ is selected so as to substantially cancel the high frequency degenerative feedback thereby effecting good high frequency response. The 6V6 tubes are transformer coupled by means of transformers $T_3$ and $T_4$ to 500 ohm load of potentiometer $P_6$, which sets the output level. Transformer $T_3$ is also coupled to diodes $D_1$ and $D_2$ of tube $6H6_3$ which is biased to a value determined by the resistance of $R_{40}$ and $R_{41}$. When the peak level exceeds this bias, rectified voltage appears across resistor $R_{30}$ and condenser $C_{14}$ and is applied to the control grids of the 6SK7 tubes through potentiometers $P_3$ and $P_4$, causing their gain to be instantaneously reduced. The control ratio is determined by the overall gains of the 6SK7 and 6V6 tubes, and the fixed bias on $D'_1$ and $D'_2$ of tube $6H6_3$. Control ratio is defined as the increase in output to corresponding increase in input, after limiting begins.

Transformer $T_7$ supplies power for all of the tube heaters and high voltage rectifier 5U4G. The rectifier output is filtered by reactors $L_2$, $L_3$ and condensers $C_{15}$, $C_{16}$, $C_{17}$ and $C_{18}$. The voltage is regulated by tubes VR150-30 and VR105-30 plate voltage supply to the 6L7 tubes, 6SK7 tubes, 6N7, 6SR7 and the screen of the 6V6 tubes is maintained at a constant value of 255 volts. The screen supply of the 6L7 tubes and plate of the 6SK7 and bias of $6H6_3$ is maintained constant at 105 volts. Resistor $R_{36}$ adjusts for proper operation of the voltage regulator tubes.

Switches $S_2$ and $S_3$ may be operated, placing meters $M_1$ and $M_2$ in the audio input and output circuits respectively. The pad made up of resistors $R_{48}$ and $R_{49}$ and $R_{50}$ is provided to cause meter $M_1$ to operate at proper level. Likewise the pad constituted by reactors $R_{27}$, $R_{28}$ and $R_{29}$ sets the level for meter $M_2$.

The combined program level and peak control system of my invention may be used singly as a program level control or as a program peak control or limiter or both functions of the system may be employed simultaneously. The circuit arrangement of my invention has numerous applications in telephone systems generally and in any voice modulation system whether at a transmitter or receiving station. The reference herein to the use of the system of my invention in association with broadcast transmitters is but one application of the circuit of my invention and it will be understood that I may employ the circuit herein in connection with radio transmitters generally, line wire telephone circuits, wired radio systems, television transmitting and receiving systems, FM transmission and receiving circuits, point to point relay stations and in all applications where modulated signalling energy must be transmitted and reproduced with high fidelity.

While I have described my invention in one of its preferred embodiments I realize that changes may be made in details of the circuit arrangement and I intend that no limitations be placed upon my invention other than may be imposed by the scope of the appended claims.

What I claim and desire to secure by Letters Patent of the United States is as follows:

1. A combined signal level control and peak limiter for communication systems comprising a signal amplification channel and a program level control channel, circuits interconnecting the input systems of both of said channels, said signal amplification channel including a multiplicity of balanced electron tube circuits progressively coupled one to another and coupled to an output system and a multiplicity of coacting rectifier circuits disposed in said program level control channel and connected with said balanced electron tube circuits and excited by the currents incident upon the program level control channel for separately controlling the bias potential on each of the balanced electron tube circuits in the signal amplification channel to compensate for changes in the characteristics and peaks of the signal level in the input system of said signal amplification channel.

2. A combined signal level control and peak limiter for communication systems comprising a multiplicity of intercoupled balanced electron tube systems each including a cathode, a control grid, a first supplemental grid, a second supplemental grid and an anode, a signal input circuit connected with the cathodes and control grids of one of said balanced electron tube systems, a signal output circuit connected with the output system of the anode and cathode of the last of said intercoupled balanced electron tube systems, a program level control system including an amplifier having an input circuit connected with the input system of the first of said balanced electron tube systems, a multiplicity of rectifier circuits connected with said amplifier and a multiplicity of bias control circuits independently excited by the rectifier circuits in said program level control channel and connected with the control grids and one of said supplemental grids of said balanced amplifier systems, and means for applying bias potential to the other of said supplemental grids for controlling the instantaneous bias potentials of the first and second supplemental grids and the control grids of said balanced electron tube systems.

3. A combined signal level control and peak limiter for communication systems comprising a multiplicity of intercoupled balanced electron tube systems including coacting cathodes, control grids, a pair of supplemental grids, and anodes, a signal input system connected to the control grids and cathodes of the first of said balanced electron tube systems, an output system connected to the anodes and cathodes of the last of said intercoupled balanced electron tube systems, a program level control channel comprising a plurality of intercoupled electron tubes having an input circuit connected in common with the input circuit of the first of said balanced electron tube systems and a multiplicity of rectifier circuits excited by said program level control channel and connected with the control grids and one of said supplemental grids of said balanced electron tube systems for controlling the bias potential of said control grids and one of said supplemental grids, means for applying bias potential to the others of said supplemental grids and an inductive load in the input circuit of the last of said intercoupled balanced electron tube systems for compensating for variations in the signal level impressed upon said input system.

4. A combined signal level control and peak limiter for communication systems comprising a signal amplification channel and a program level control channel, circuits interconnecting the input systems of both of said channels, said signal amplification channel including a multiplicity of balanced electron tube circuits progressively coupled one to another and coupled to an output system and a multiplicity of rectifier circuits in said program level control channel connected with said balanced electron tube circuits for effectively biasing certain of said balanced electron tube circuits in said signal amplification channel, a separate rectifier associated with the output system of said signal amplification channel and connections from said last mentioned rectifier and certain of the other of said balanced electron tube circuits for controlling the operating characteristics of said signal amplification channel at constant level irrespective of variations of the energy supplied to the input of said signal amplification channel.

5. A combined signal level control and peak limiter for communication systems comprising a multiplicity of intercoupled balanced electron tube systems, certain of said electron tube systems each including a cathode, a control grid, a pair of supplemental grids and an anode, a signal input circuit connected with the cathodes and control grids of one of said balanced electron tube systems, a signal output circuit connected with the anodes and cathodes of the last of said intercoupled balanced electron tube systems, a program level control system connected with the signal input circuit and a multiplicity of rectifiers controlled by the signal current in said program level control system for separately controlling the bias potential of the control grids, and certain of said supplemental grids of the balanced electron tube systems in said signal amplification channel.

6. A combined signal level control and peak limiter for communication systems comprising a signal input circuit, a multiplicity of intercoupled balanced electron tube systems associated with said signal input circuit and each comprising multi-grid electron tubes having input and output circuits, a program level control channel, means interconnecting the input circuits of certain of said balanced electron tube systems and the input circuit of said program level control channel for impressing variable program currents thereon, a multiplicity of rectifiers controlled by said program level control circuit for developing bias potentials from the signal currents and means for separately applying said bias potentials to the individual grids of said multi-grid electron tubes, a separate rectifier connected to the output circuit of the last of said balanced electron tube systems associated with said signal input circuit and a bias control circuit energized by said last mentioned rectifier and connected with certain of the grids of certain of the electron tubes in said balanced electron tube systems for controlling the operation of said balanced electron tube systems under substantially constant operating characteristics irrespective of variations in the input currents supplied to said balanced electron tube systems.

7. A combined signal level control and peak limiter for communication systems comprising a signal input circuit, a multiplicity of intercoupled balanced electron tube systems associated with said signal input circuit and each comprising a multi-grid electron tube having input and output circuits a signal reproducing system connected with the final balanced electron tube system, a program level control channel, means interconnecting the input circuits of certain of said balanced electron tube systems and the input circuit of said program level control channel for impressing variable program currents thereon, means controlled by said program level control circuit for developing bias potentials, means for separately applying said bias potentials to the grids of said multi-grid electron tubes for controlling the operation of said balanced electron tube systems under substantially constant operating characteristics irrespective of variations in the input currents supplied to said balanced electron tube systems, an inductive impedance interposed between the output of one of the intercoupled electron tube systems and the input of another of said intercoupled electron tube systems and operating to regulate the time period over which the bias on the grids of said last mentioned balanced electron tube systems is sustained and a rectifier connected with the output of the last of said balanced electron tube systems and operating to deliver bias potential to the grids of certain of the balanced electron tube systems for delivering to the signal reproducing system program currents at substantially constant level irrespective of variations in program current level at the signal input system.

8. A combined signal level control and peak limiter for communication systems comprising a signal input circuit, a multiplicity of intercoupled balanced electron tube systems associated with said signal input circuit and each comprising a multi-grid electron tube having input and output circuits, a program level control channel, means interconnecting the input circuits of certain of said balanced electron tube systems and the input circuit of said program level control channel for impressing variable program currents thereon, means controlled by said program level control circuit for developing bias potentials, means for separately applying said bias potentials to the grids of said multi-grid electron tubes for controlling the operation of said balanced electron tube systems under substantially constant operating characteristics irrespective of variations in the input currents supplied to said balanced electron tube systems, an inductive impedance interposed between the output of one of the intercoupled electron tube systems and the input of another of said intercoupled electron tube systems and adjusted to resonate at approximately forty cycles, and operating to regulate the time period over which the bias on the grids of said last mentioned balanced electron tube systems is sustained, rectifier connected with the output of the last of said balanced electron tube systems and operating to deliver bias potential to the grids of certain of the balanced electron tube systems for delivering program currents at substantially constant level irrespective of variations in program current level at the signal input system.

ROYAL V. HOWARD.

REFERENCES CITED

The following references are of record in the file of this patent:

UNITED STATES PATENTS

| Number | Name | Date |
|---|---|---|
| 2,012,810 | Doba | Aug. 27, 1935 |
| 2,213,034 | Barney | Aug. 27, 1940 |
| 2,244,695 | Hathaway | June 10, 1941 |
| 2,247,468 | Barr et al. | July 1, 1941 |
| 2,250,559 | Weber | July 29, 1941 |
| 2,276,873 | Rambo | Mar. 17, 1942 |
| 2,276,952 | Franklin | Mar. 17, 1942 |
| 2,286,106 | Ritzmann | June 9, 1942 |
| 2,390,850 | Singer | Dec. 11, 1945 |
| 2,392,384 | Howard | Jan. 8, 1946 |
| 2,404,160 | Boucke | July 16, 1946 |